US005734577A

United States Patent [19]

Chesir et al.

[11] Patent Number: 5,734,577

[45] Date of Patent: Mar. 31, 1998

[54] ADAPTIVE IIR MULTITONE DETECTOR

[75] Inventors: Aaron Michael Chesir, Edison; Carl Jerome May, Holmdel, both of N.J.

[73] Assignee: Lucent Technologies Inc., Murray Hill, N.J.

[21] Appl. No.: 615,547

[22] Filed: Mar. 11, 1996

[51] Int. Cl.[6] ............................................. H03D 3/00
[52] U.S. Cl. ............................................. 364/484; 342/159
[58] Field of Search ............................. 364/484; 342/159, 342/162; 84/616; 324/76.12, 76.15, 76.19, 76.28

[56] References Cited

U.S. PATENT DOCUMENTS

| 4,403,298 | 9/1983 | May, Jr. . | |
| 5,179,542 | 1/1993 | Reese et al. | 367/135 |
| 5,202,528 | 4/1993 | Iwaooji | 84/616 |
| 5,317,524 | 5/1994 | Das et al. | 364/484 |
| 5,583,784 | 12/1996 | Kapust et al. | 364/484 |

Primary Examiner—Emanuel T. Voeltz
Assistant Examiner—Thomas Peeso

[57] ABSTRACT

An adaptive Infinite Impulse Response (IIR) filter is provided that can adaptively detect the presence of one or more tones in its input stream. The tones to be detected may be of arbitrary frequency, subject only to a limitation that such tones fall within a frequency band consistent with accepted sampling principles (e.g., a maximum frequency of interest no greater than one-half the sampling frequency—Nyquist sampling criteria). An IIR filter developed according to the method of the invention will adaptively locate the frequencies of tones to be detected, thereby allowing for frequency drift from nominal expected frequency values with no loss in accuracy. Such a filter will also process the input signal sample-by-sample, thereby avoiding the blocking problem of FFT-based filter approaches. With the filter of the invention, an application can identify the frequencies, associated power levels, SNR and duration of the tones. Thus, such an application can use a simple user specified library of tone parameters to decide if tones of interest are present in the input stream.

28 Claims, 8 Drawing Sheets

ADAPTIVE IIR MULTITONE DETECTOR

FIELD OF THE INVENTION

This application is related to digital signal processing and more particularly to an apparatus and method for adaptively detecting one or more tones in an unknown input signal.

BACKGROUND OF THE INVENTION

There are many physical phenomena which are represented as a continuous wave of energy having a generally sinusoidal form. Among such phenomena are pressure waves (such as sound waves), electromagnetic waves (such as an electrical signal in a conductor or an rf signal), water waves or seismic waves. Moreover, it will often be desirable or necessary to determine a frequency or frequencies at which such waves are propagating.

As a simple but illustrative example of this property and the need to detect a frequency of a signal in question, consider the DTMF signaling used in the telephone system. It is well known that the DTMF tones, which are used for various signaling purposes in telephony, notably providing signaling information to a central office switch as to digits dialed by a user from a dialpad, represent each of the digits 0 through 9, along with "#" and "*", as a sum of two sinusoidal tones (or frequencies). These 12 digits and symbols are commonly deployed as a matrix of four rows and three columns, and accordingly the two tones representing each digit or symbol correspond to a row frequency and a column frequency for the position of the selected digit or symbol. Thus all of the DTMF tones may be represented by various combinations of seven frequencies taken two at a time. Now, to recognize the signal representing the digit or symbol sent, it is necessary to detect each of the tones comprising that signal. One means which has been used to so detect those tones is an array of seven notch filters, each tuned to one of the primary DTMF frequencies, all acting on the input DTMF signal. The two filters in such an array having a substantially reduced output, compared to the input signal, would therefore provide an indication of the primary tones in the input signal. A table lookup can then be provided to relate that combination of tones to the selected digit or symbol.

A variety of undesirable characteristics are associated with this methodology for detecting the DTMF tones. To begin with, a relatively large number of filters are required at each point where the DTMF signals are to be decoded. Additionally, any frequency drift, or other frequency deviation from the DTMF standard, on the part of either the source or the detecting filter, carries with it the potential for significant error in the detection process—either missed detection or erroneous detection. And finally, the detection of particular tones in an input signal is made substantially more difficult by a significant noise content in the signal, such as would likely be seen in an rf signal, as in wireless telephony.

Some of these problems are ameliorated by use of a new tool which has come to the fore in approximately the last decade (coincident with the growth of microelectronics and greatly increased computing power), Digital Signal Processing ("DSP"). The basic idea of DSP is that of numerical manipulation of signals and data in sampled form. To that end, a continuous input signal may be sampled at predetermined intervals, using a specified number of sampling points per cycle of the signal, to arrive at a sequence of discrete numbers, each being representative of a value (e.g., magnitude) of the continuous signal at the sample point. Once that sequence of sample values is available, those values can be analyzed using DSP techniques to detect information related to the underlying signal—e.g., to assess frequencies present in the signal.

The discussion following, which considers the detection of tones (i.e., sinusoidal signals) using DSP methods, is framed in terms of DSP concepts and mathematical relations expressed in the context of Z transforms. Such concepts and terminology will be well understood by those skilled in the art of Digital Signal Processing. For those wishing to explore the ideas of DSP and Z transforms further, there are a number of good general DSP texts available. Illustrative of the genre is P. A. Lynn and W. Fuerst, "Introductory Digital Signal Processing With Computer Applications", John Wiley and Sons Ltd. (1992).

Figure 1:
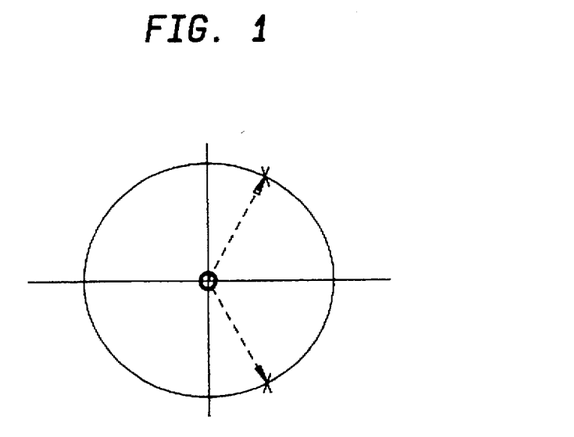
FIG. 1 shows a Z-plane diagram for a second order digital filter.

As noted above, frequency detection is ordinarily concerned with sinusoidal frequency signals. Therefore it is useful to begin a review of DSP filtering techniques by briefly considering the development of the Z transform for a sine wave. If a second-order digital filter is constructed with a double-zero at the origin and a complex-conjugate pair of poles on the unit circle, and a unit impulse applied to the filter, the output of the filter will forever ring at the frequency corresponding to the angle of the poles. Such a filter has the z-plane diagram shown in FIG. 1. That diagram can be represented by the following difference equation:

$$y(n) = x(n) + 2\cos(\omega T)y(n-1) - y(n-2) \quad (1)$$

where:

$$\omega T = 2\pi fT = 2\pi \frac{f}{f_{sample}} \quad (2)$$

The term "$\omega T$" is the angle (measured in radians) of the poles, relative to the x axis. More particularly, the variable "$\omega$" is the radian frequency and the variable "T" is the sampling period. The value "f" is the frequency of the tone to be generated. The value "$f_{sample}$" is the sampling frequency (measured in the same units that are used to measure "f", usually in Hz).

As is well known, if x(n) is the unit impulse, then it is equal to 0 at all sampling instants other than time n=0. Accordingly, a pure sine wave can be described by rewriting Equation 1 as it applies to all sampling instants other than n=0, bearing in mind that the angle of the poles is $\pm(2*\pi*f/f_{sample})$, in the form of the following auto-regressive process:

$$y(n) = 2\cos\left(2\pi \frac{f}{f_{sample}}\right) y(n-1) - y(n-2) \quad (3)$$

Such a difference equation can be used to generate a sine wave with arbitrary amplitude, frequency, and phase. To do so, one would simply initialize y(n−1) and y(n−2) to the values of the desired sine wave at sampling instants n=−1 and −2, respectively.

It was suggested above, in connection with the discussion of the exemplary DTMF detection problem, that two particularly important characteristics of such a filter were: (1) an ability to detect the frequency(ies) of interest on a noisy channel and (2) an ability to detect a tone which is displaced in frequency somewhat from the frequency of an ideal tone expected on a channel. A filter which is able to detect such a displaced tone is said to be able to adapt to the displacement circumstances and thus find and detect the tone of interest. Such a filter is designated herein as an "adaptive" filter and is characterized by an ability to "hunt" for the tone of interest in a band of frequencies around the frequency of the tone of interest. Note that the term "tone" is used herein to apply to any sinusoidal signal, and should not be construed as being limited to a particular frequency band.

Figure 2:
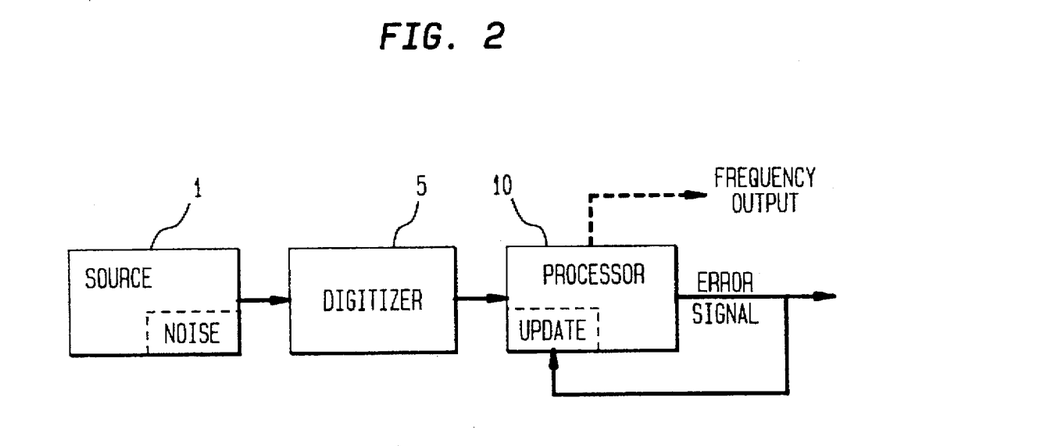
FIG. 2 depicts in block diagram form a generalized adaptive digital filter.

An illustrative example of an adaptive digital filter in shown in FIG. 2. A sinusoidal signal including a frequency of interest is generated by Source 1. That signal, which will also contain gaussian noise, will be operated on by Digitizer 5 to sample the signal over a time interval and provide a sequence of numeric values proportional to the values of the sinusoidal input signal at the sampling interval. The digitized signal is then fed to Processor 10 which computes a predicted value for the frequency of interest based on prior values of the input signal (and, in certain cases explained below, of the output signal as well), compares that predicted value with the actual value of the input signal and produces an error signal related to the difference. That error signal is then fed back to Processor 10, where it is used to update an adaptation term used in the prediction process for computing the predicted value of the next value of the input signal. That adaptation term is itself a function of the predicted frequency for the input signal. When the error term is reduced, through this feedback process, to a minimum (or below a selected threshold), the frequency determined by the adaptation term is selected as the frequency of interest.

There are two generalized filter models commonly applied for digital signal processing: Finite Impulse Response ("FIR") and Infinite Impulse Response ("IIR"). It is known in the art to provide an adaptive FIR filter and such a filter is briefly described below.

I. Adaptive FIR Single-Frequency Tone Detector

A simple adaptive single-frequency tone detector can be developed with the following filter:

$$y_{probe}(n) = 2B(n)y(n-1) - y(n-2) \quad (4)$$

where $$B(n) = \cos\left(2\pi \frac{f_{estimate}(n)}{f_{sample}}\right) \quad (5)$$

and the update equation is $$B(n+1) = B(n) - \frac{1}{4} \frac{\alpha \nabla_B\{E(e^2)\}}{\sigma_y^2} \quad (6)$$

where $$e(n) = y(n) - y_{predict}(n) = y(n) - 2B(n)y(n-1) + y(n-2) \quad (7)$$

and the factor $1/\sigma_y^2$ provides a normalization with respect to the input power ($\sigma_y^2$ being the variance—or average power—of the input signal $y(n)$).

A qualitative explanation of Equation 6 is that the coefficient B is adapted in the direction opposite that which results in maximizing the error, e(n). The assumption (which is borne out well in practice) is that the direction opposite that which maximizes the error is a direction which minimizes the error. Equation 6 is the cornerstone equation of the class of adaptive filter algorithms known as Steepest-Descent algorithms, which in turn are the most popular adaptive filter algorithms, owing to their simplicity and ease of implementation.

The $\alpha$ in Equation 6 is the step-size parameter of the adaptive filter update process. Setting the value high ensures faster convergence rate, but coarser granularity in the frequency estimate, or possibly adaptation instability. Setting the value low increases adaptation stability and promotes freer granularity in the frequency estimate, but leads to slower convergence. Methods for determining the optimal value for $\alpha$ are well known. [See, e.g., *Adaptive Filter Theory*, Simon Haykin, pp 275-295, Prentice-Hall, 1991].

These methods require computation of complex statistics of the input signal and therefore motivate the use of trial-and-error settings for $\alpha$ when the real-time constraints of the application do not allow for such complex computations. One such method is to simulate the expected range of an input signal and pick a value for $\alpha$ that results in good convergence speed without adaptation instability.

The normalization with respect to input power in Equation 6 allows one to pick a step size and not have to vary it based upon input signal amplitude.

The right-most side of Equation 7 shows that the FIR tone detector is based upon an FIR notch filter with a conjugate pair of zeroes on the unit circle (as long as B is between $-1.0$ and $1.0$).

From a consideration of the linearity of the expected-value operator (the $E_0$ in Equation 6) and the linearity of the gradient function (the del in Equation 6), it can be seen the two operations may be interchanged with the following results:

$$\frac{1}{4} \nabla_B\{E(e^2)\} = \frac{1}{4} E\{\nabla_B(e^2)\} = \frac{1}{4} E\left\{\frac{\partial(e^2)}{\partial B}\right\} = \quad (8)$$

$$\frac{1}{4} E\left\{2e(n)\frac{\partial(e)}{\partial B}\right\} = \frac{1}{2} Ee(n)\frac{\partial(e)}{\partial B}$$

$$\frac{\partial(e)}{\partial B} = -\frac{\partial(y_{predict})}{\partial B}$$

$$\frac{\partial(y_{predict})}{\partial B} = 2y(n-1)$$

$$\therefore B(n+1) = B(n) + \frac{\alpha E\{e(n)y(n-1)\}}{\sigma_y^2}$$

One method of replacing the expected value operator in Equation 8 with an expression more suitable for a real-time signal processor is the LMS (Least Mean Squares) algorithm [See, *Adaptive Filters: Structures, Algorithms, and Applications*, Michael Hoenig and David Messerschmitt, pp 49-62, Kluwer Academic Publishers, 1984] which is described below:

Consider that the product $e(n)*y(n-1)$ is a stochastic approximation of $E\{e(n)*y(n-1)\}$. The update equation then simplifies to:

$$B(n+1) = B(n) + \frac{\alpha e(n)y(n-1)}{\sigma_y^2} \quad (9)$$

An alternative derivation of Equation 9 is as follows: If Equation 7, is rewritten in the form $$e(n) = 2\cos(\omega T)y(n-1) - y(n-2) - 2B(n)y(n-1) + y(n-2) = 2[\cos(\omega T) - B(n)]y(n-1) \quad (10)$$

it can be seen that the function $y(n-1)$ is exactly in phase with $e(n)$ when the necessary correction to B is positive and exactly out of phase with $e(n)$ when the necessary correction to B is negative. Therefore the product $e(n)y(n-1)$ is always of the same sign as the necessary correction to B. The following adaptation equation can then be used for an adaptive FIR tone detector:

$$B(n+1) = B(n) + \frac{\alpha e(n)y(n-1)}{\sigma_y^2} \quad (11)$$

where, again, normalization with respect to input signal power is included to allow the selection of $\alpha$ without regard to the level of the input signal.

While an adaptive filter based upon the LMS approximation of the update equation represented by Equation 9 will not converge as quickly as one based upon Equation 8 as the update equation, it will converge.

Such a Finite Impulse Response (FIR) filter will work quite well for single-frequency inputs when there is little-to-no additive noise. However, if the input stream contains significant additive noise, then the frequency estimate given by the filter will tend toward the "frequency center of gravity" between the frequency of the tone and the center frequency of the noise, assuming a flat noise power spectrum over a frequency interval. The higher the noise power, the more the filter frequency estimate will be biased toward the center frequency of the noise. The reason for this characteristic is that the FIR single-frequency tone detector described here is actually a very wide-band notch filter, since the poles of the filter are at the origin. Nonetheless, the filter will still adapt the locations of the zeros on the unit circle to minimize the total power that gets through the filter and, accordingly, the filter finds the "frequency center of gravity" of the input stream.

In a related paper, the inventor provides examples of an adaptive FIR filter used in the presence of significant noise to further illustrate the phenomena described herein of such a filter finding the "frequency center of gravity" for the noise signal and the desired signal together. See, A. M. Chesir, "A Robust Adaptive IIR Multiple-Tone Detector", *Proceedings of DSPx '96*, Mar. 12, 1996, San Jose, Calif.

SUMMARY OF INVENTION

Accordingly, a primary object of the invention is the achievement of an adaptive digital filter that adapts closely to the frequency of a signal of interest in the presence of significant noise in the signal channel. To that end a method is disclosed for detecting at least one frequency in an input signal, where that input signal contains significant noise, by carrying out the following steps:

sampling the input signal over a time interval at a predetermined sampling rate to provide a sequence of numerical values generally proportional to the values of the input signal at each sample point;

operating on that sequence of numerical values with a digital filter algorithm, where such algorithm has parameters chosen to cause the filter to have at least one Z-plane zero located on the Z-plane unit circle and at a radial angle, relative to a reference axis, corresponding to a frequency of interest and having at least one Z-plane pole located along a radius to that Z-plane zero, displaced from the Z-plane origin and lying within the unit circle; and causing that Z-plane zero to be displaced along a circumference of the unit circle corresponding to a predetermined frequency band so as to detect the presence of a frequency of interest in that frequency band, thereby adapting the filter to variations in the frequency of interest.

DETAILED DESCRIPTION

The discussion following will be presented partly in terms of algorithms and symbolic representations of operations on data bits within a computer system. As will be understood, these algorithmic descriptions and representations are a means ordinarily used by those skilled in the digital signal processing arts to convey the substance of their work to others skilled in the art.

As used herein (and generally) an algorithm may be seen as a self-contained sequence of steps leading to a desired result. These steps generally involve manipulations of physical quantifies. Usually, though not necessarily, these quantifies take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantifies—such terms being merely convenient labels applied to those quantities.

It is important as well that the distinction between the method of operations and operating a computer, and the method of computation itself should be kept in mind. The present invention relates to methods for operating a computer in processing electrical or other (e.g., mechanical, chemical) physical signals to generate other desired physical signals.

Figure 10:
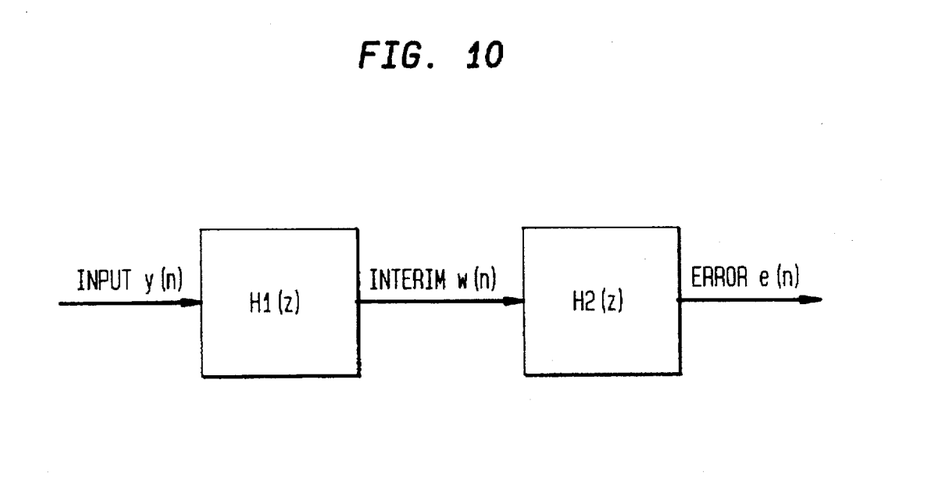
FIG. 10 shows in block diagram form the detection of dual tones according to the method of the invention.

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 1, 10 & 11 may be provided by a single shared processor. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Since real-world signals are almost always corrupted with noise, it therefore becomes an object of the invention to provide an improved adaptive impulse response filter. The main fault of the FIR tone detector is that the width of what is really an adaptive notch-filter is too wide—an inherent characteristic of FIR notch filters. It follows that significant improvement in the frequency estimate can be realized if the filter that is used is a narrow-band notch filter. Such a narrow-band notch filter can be effected with an Infinite Impulse Response (IIR) filter. However, while the idea of using an adaptive IIR filter for general applications has previously been discussed as a desirable achievement, the idea has uniformly been discarded as impractical, especially for real-time applications [See, e.g., *Adaptive Filter Theory*, Simon Haykin, page 159, Prentice-Hall, 1991].

This lack of realization of an adaptive IIR filter is due primarily to two factors:

1. The difficulty in deriving a closed-form expression for the gradient of the error with respect to the coefficient being adapted (necessary for implementing Equation 6 above, the cornerstone equation of all Steepest-Descent adaptive filter algorithms), and
2. The potential for instability, which may occur if any of the poles of the transfer function adapt to a point outside the unit circle in the z-plane.

In a general-case digital filter, there is more than one filter coefficient to adapt. Equation 6 above is then applied for each coefficient. The variable B in Equation 6 is replaced by the coefficient term being adapted, and the equation is used to update each coefficient at a time. In the case of an IIR filter, which includes feedback terms, one may need to adapt some of the coefficients of the feedback terms. Herein lies the difficulty. In Equation 6, the adaptation depends upon the gradient of the error signal with respect to the coefficient being adapted. But, for an IIR filter, the error signal depends upon past outputs and the associated coefficients (whereas, for an FIR filter, only past inputs are involved), which in turn depend upon past outputs and the associated coefficients, and so on back to the origin of time. In the general case of an IIR adaptive filter, the closed form of the gradient term in Equation 6 is difficult to derive and complex to implement (which bears heavily upon real-time design constraints).

Moreover, unless checks are implemented in the algorithm, pole positions may adapt to points outside the unit circle. Once this happens it is highly likely that the filter will become unstable—producing wildly large outputs in response to perhaps infinitesimal inputs.

With the methodology of the invention, these two concerns can be avoided for the case of tone detection, by taking advantage of the fact that the idealized form of the input (i.e. a tone with no added noise) itself has a convenient closed-form description—that of Equation 3.

Hereafter an adaptive IIR single frequency tone detector implemented according to the invention is disclosed and described. The concepts described for that single frequency IIR detector are then carried forward to the development of an adaptive IIR multiple-frequency tone detector.

I. Adaptive IIR Single-Frequency Tone Detector

Figure 3:
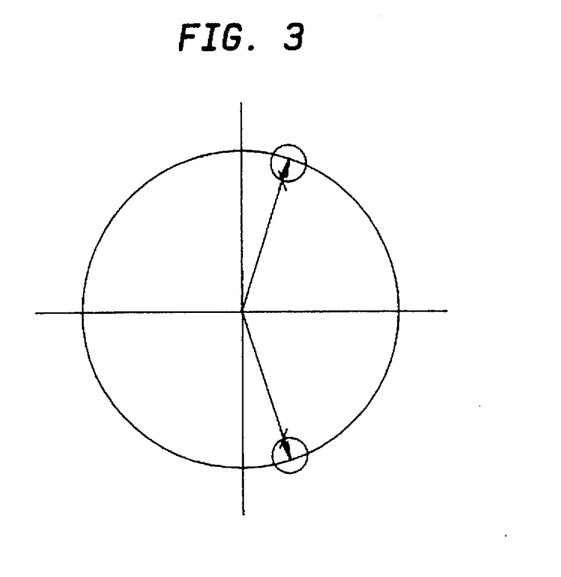
FIG. 3 shows a Z-plane diagram for a second order IIR digital notch filter.

A Z-plane pole-zero plot for a second-order IIR digital notch filter is shown in FIG. 3. Such a filter will have the following transfer function $$H(z) = \frac{z^2 - 2\cos(2\pi f/f_{sample})z + 1}{z^2 - 2\rho\cos(2\pi f/f_{sample})z + \rho^2} \quad (12)$$

In Equation 12, the argument to the cos( ) function is the angle of the zeroes (and, as well, the poles) of the filter. The radius of the poles in the figure is the variable $\rho$ in Equation 12.

As long as the radius is prevented from exceeding unity, the filter will be stable. The closer the poles are to the unit circle, the sharper the notch (i.e. the narrower the notch-band) will be; however, the step response of the filter increases as the poles approach the unit circle.

By replacing the cos( ) terms in Equation 12 with B(n) for the frequency estimate, and recalling that Equation 7 shows that the error signal is really the output of the adaptive notch filter, the IIR error term can be written:

$$e(n) = y(n) - 2B(n)y(n-1) + y(n-2) + 2\rho B(n)e(n-1) - \rho^2 e(n-2) \quad (13)$$

The fact that the ideal input is a second order system can then be used to advantage by substituting Equation 3 into Equation 13:

$$e(n) = 2\cos(\omega T)y(n-1) - y(n-2) - 2B(n)y(n-1) + \\ y(n-2) + 2\rho B(n)e(n-1) - \rho^2 e(n-2) \quad (14)$$

$$e(n) = 2[\cos(\omega T) - B(n)]y(n-1) + 2\rho B(n)e(n-1) - \rho^2 e(n-2)$$

$$E(z) = \frac{2[\cos(\omega T) - B]z^{-1}}{1 - 2B(n)\rho z^{-1} + \rho^2 z^{-2}} Y(z) = 2[\cos(\omega T) - B]z^{-1}C(z),$$

$$C(z) = \frac{Y(z)}{1 - 2B(n)\rho z^{-1} + \rho^2 z^{-2}}$$

$$c(n) = y(n) + 2B(n)\rho c(n-1) - \rho^2 c(n-2)$$

where E(z) and Y(z) are the Z transforms of e(n) and y(n) respectively, C(z) is a defined function of Y(z), and c(n) is the inverse Z transform of C(z).

$$\therefore e(n) = 2[\cos(\omega T) - B(n)]c(n-1) \quad (15)$$

Equation 15 shows that the function c(n−1) is exactly in phase with e(n) when the necessary correction to B is positive and exactly out of phase with e(n) when the necessary correction to B is negative. Therefore the product e(n)c(n−1) is always of the same sign as the necessary correction to B. By considering the similarity to Equation 10, one can then use the following adaptation equation for the adaptive IIR tone detector of the invention:

$$B(n+1) = B(n) + \frac{\alpha e(n)c(n-1)}{\sigma_c^2} \quad (16)$$

where the normalization with respect to the power in the c(n) signal is added for the same reason the normalization was added in the case of the adaptive FIR tone detector.

Figure 4:
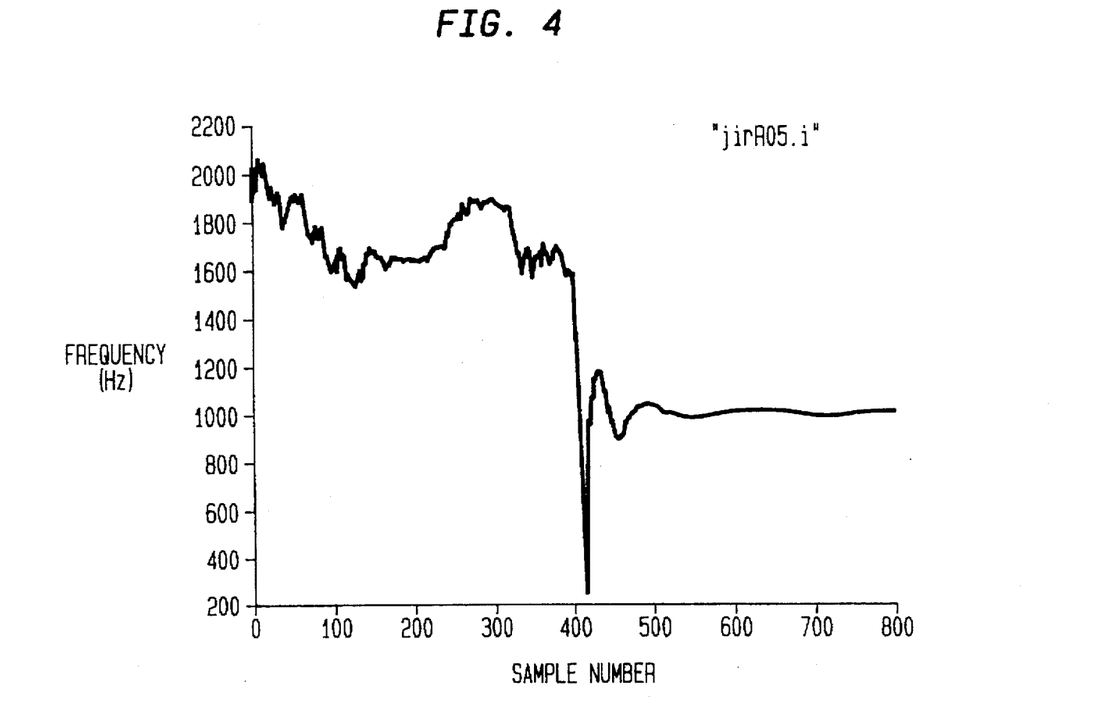
FIGS. 4 & 5 provide plots of Frequency Estimate and Signal-to-Error Ratio for an IIR adaptive tone detector developed according to the method of the invention.
Figure 5:
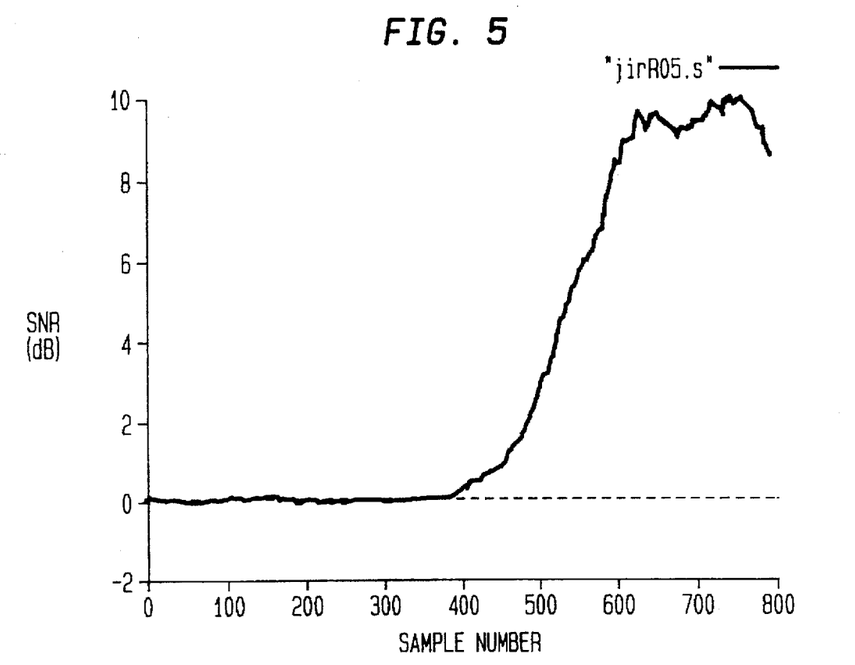

FIGS. 4 and 5 provide plots of Frequency Estimate and Signal-to-Error Ratio for this IIR adaptive tone detector, based on the following illustrative characteristics:

8 KHz sampling rate.

400 samples of white noise at a power level of −27 dBm, followed by 400 samples of the sum of a pure 1000 KHz sine wave at a power level of −17 dBm and additive white noise at a power level of −27 dBm.

Adaptive filter step size of 0.05.

Pole radius fixed at 0.99

Figure 6:
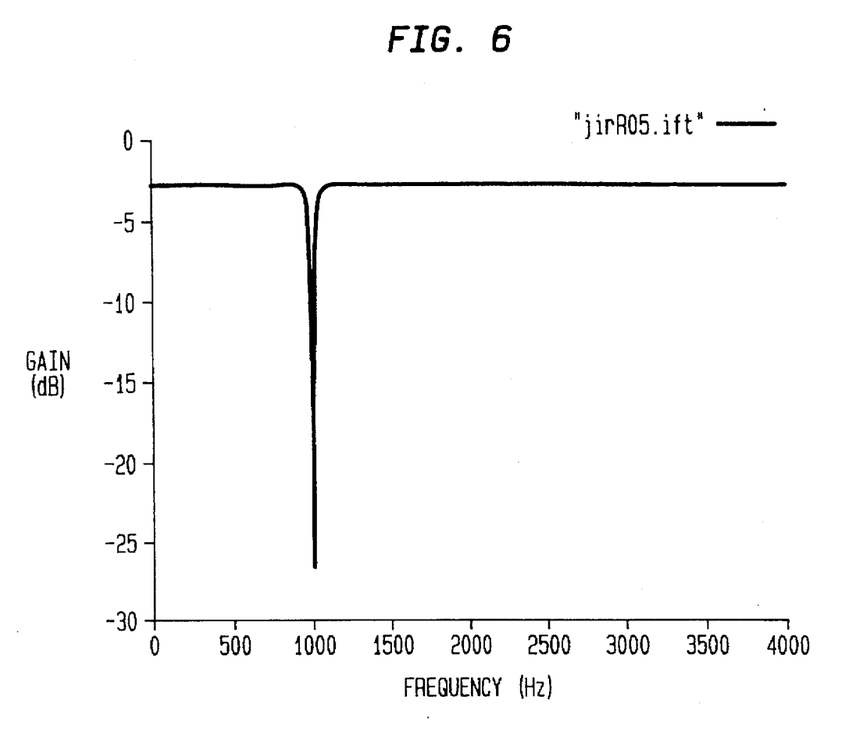
FIG. 6 shows the frequency gain characteristic for such an IIR adaptive tone detector.

The average frequency estimate of the last 200 samples is 1000.81 Hz. The range of the last 200 frequency estimates is 989.337 Hz to 1010.52 Hz. In FIG. 6, the frequency gain characteristic of the notch filter with B=cos(2π(1000.81/8000)) and ρ=0.99 is shown.

As a further embodiment of the invention, an adaptive IIR filter is hereafter described which overcomes a limitation of the previously described IIR filter. It was noted in the Background section that an FIR filter has the characteristic of converging quickly, although to the wrong answer when significant additive white noise is present. The general IIR filter, on the other hand, converges slower, but to a much more accurate answer. In this further embodiment of the invention, a methodology, in the nature of a hybrid of an FIR filter and an IIR filter, is described for achieving a faster, more accurate filter.

As previously discussed, the step response of an IIR filter becomes slower as the pole position moves closer to the unit circle. This characteristic is intuitively reasonable, since the corresponding difference equation directly shows that the coefficients of the difference equation that correspond to the dependence of the current output upon prior outputs increase as the pole radius increases. This results in the filter having greater "hysteresis" (such term being used very loosely), and therefore a longer step response.

Consider that an FIR filter is an IIR filter with the pole radii set to 0, and would accordingly be expected to have a quicker step response. The approach then for this further embodiment is to start the IIR filter with the pole radius set to 0 and increase it slowly toward 1.0, as the apparent signal-to-error ratio is above a decided threshold.

Figure 7:
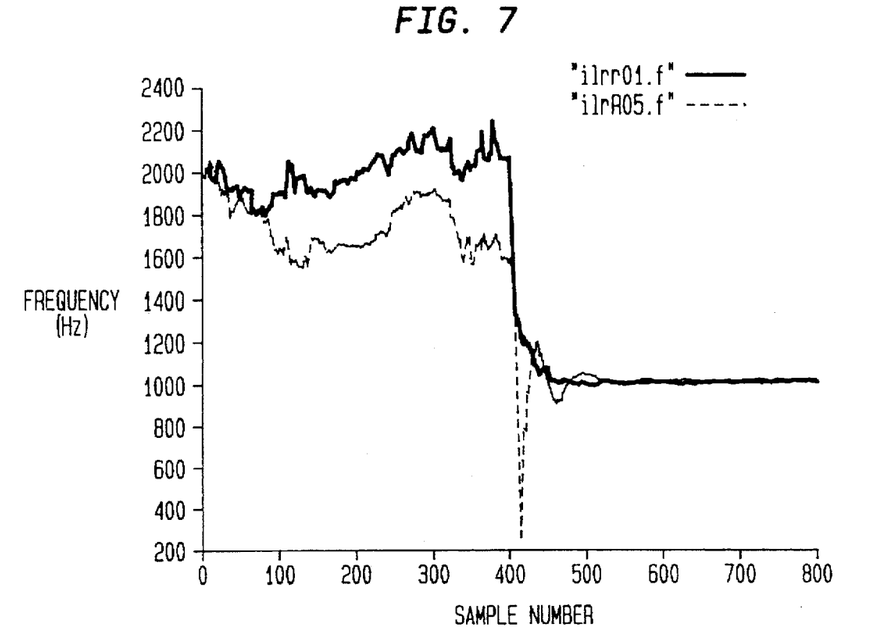
FIGS. 7 & 8 provide a comparison of the performance of fixed-radius and adaptive-radius IIR tone detectors developed according to the method of the invention.
Figure 8:
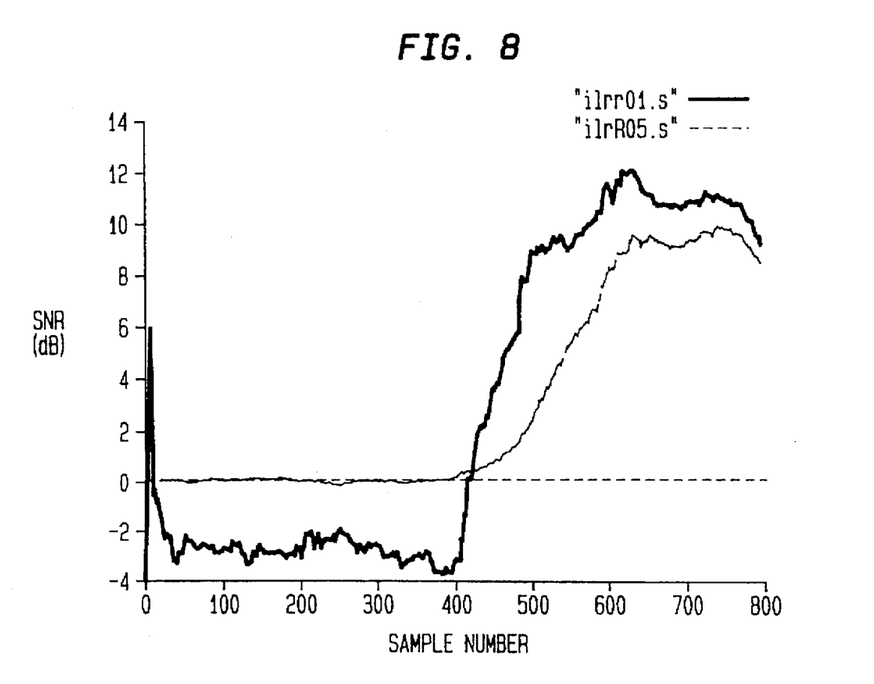

In FIGS. 7 and 8, the above-described IIR filter is used, with the pole radius, $\rho$, increasing if the signal-to-error ratio is positive and decreasing if it is negative. For increases:

$$\rho(n+1)=\rho(n)+0.03(1.0-\rho(n)) \tag{17}$$

For decreases:

$$\rho(n+1)=0.97\rho(n) \tag{18}$$

The effects of the above radius-adapt equations are to increase the radius by a fraction of the remainder to unity, or to decrease it by scaling the radius down.

Filter stability is guaranteed by ensuring that, after the radius is increased in accordance with Equation 17, the radius value is clipped at some set threshold. For an illustrative embodiment of the invention, a limit of $\rho_{max}=0.99$ was used.

FIGS. 7 and 8 also provide a comparison of the performance of the fixed-radius and adaptive-radius IIR tone detectors. Both filters were presented with the same input stream. In the case of the fixed-radius filter, the step size that exhibited the best performance was 0.05. In the case of the adaptive-radius filter, the step size that exhibited the best performance was 0.01. The curves in solid lines in the figures represent the adaptive-radius filter and the curves in dotted lines represent the fixed-radius filter.

The average of the last 200 frequency estimates of the adaptive-radius IIR filter is 999.443 Hz. The range of the last 200 frequency estimates is 997.895 Hz to 1000.49 Hz. These values indicate that an adaptive-radius IIR filter provides a better frequency detector than the fixed-radius adaptive IIR filter.

II. Adaptive IIR Multiple-Frequency Tone Detector

Figure 9:
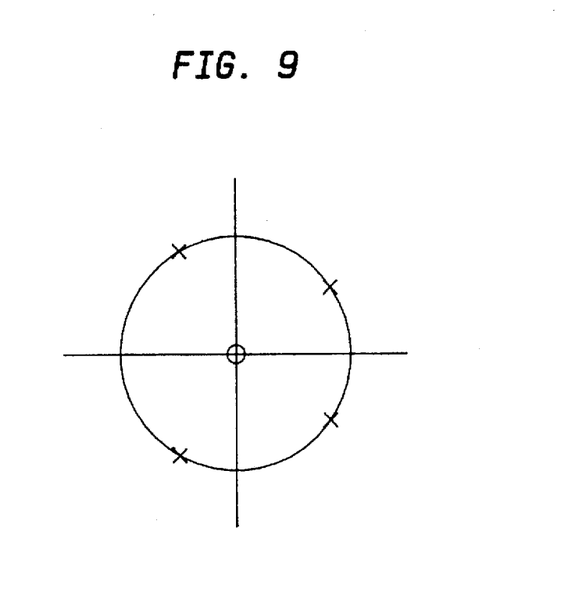
FIG. 9 shows the Z-plane pole-zero plot for a dual-tone generator.

The high-performance single-frequency tone detector described in the previous section can now be used as a building block to construct a multiple-tone detector. Consider the Z-plane pole-zero plot of a dual-tone generator shown in FIG. 9 (the zero at the origin is fourth-order). The transfer function for such a generator is:

$$H(z)=\frac{z^4}{(z^2-2\cos(\omega_1 T)z+1)(z^2-2\cos(\omega_2 T)z+1)} \tag{19}$$

The approach, then, of the methodology of the invention is to build a dual-tone detector by cascading two single-tone detectors (using the single-tone methodology described above), and adapting each one to detect one tone (not the tone that the other block is seeking). The conceptual arrangement is shown in block diagram form in FIG. 10.

The transfer function of such cascaded single frequency tone detectors is $$w(n) = y(n)*h_1(n) \tag{20}$$
$$e(n) = w(n)*h_2(n) = y(n)*h_1(n)*h_2(n)$$

$$H_1(z) = \frac{z^2 - 2B_1(n)z + 1}{z^2 - 2\rho B_1(n)z + \rho^2}$$

$$H_2(z) = \frac{z^2 - 2B_2(n)z + 1}{z^2 - 2\rho B_2(n)z + \rho^2}$$

$$B_1(n) = \cos\left(2\pi \frac{f_{1_{estimate}}(n)}{f_{sample}}\right) = \cos(\omega_1 T)$$

$$B_2(n) = \cos\left(2\pi \frac{f_{2_{estimate}}(n)}{f_{sample}}\right) = \cos(\omega_2 T)$$

It is assumed for simplicity that the pole radius of the first filter is the same as that of the second filter.

The update equations for the two single-frequency detectors are:

$$B_1(n+1) = B_1(n) - \frac{1}{2} \frac{\nabla_{B_1}\{E(e^2)\}}{\sigma^2_{y,c}} \tag{21}$$

and $$B_2(n+1) = B_2(n) - \frac{1}{2} \frac{\nabla_{B_2}\{E(e^2)\}}{\sigma^2_{y,c}} \tag{22}$$

where the normalization is with respect to either y(n) or c(n), as determined below. Following the derivation used for the adaptive IIR single frequency detector, $$B_1(n+1) = B_1(n) - \frac{1}{4} \alpha \frac{\partial(e^2)}{\partial B_1} = B_1(n) - \frac{1}{2} \alpha e(n) \frac{\partial e}{\partial B_1} \tag{23}$$

$$\frac{\partial e}{\partial B_1} = \frac{\partial(w(n)*h_2(n))}{\partial B_1} = \frac{\partial w}{\partial B_1} *h_2(n)$$

But w(n) is simply the error signal that is output from the first stage. Accordingly, From Equation 15, $$\frac{\partial w}{\partial B_1} = -2c_1(n-1), \tag{24}$$

$$c_1(n) = y(n) + 2\rho(n)B_1(n)c_1(n-1) - \rho^2(n)c_1(n-2)$$

$$\therefore B_1(n+1) = B_1(n) + \frac{\alpha e(n)(c_1(n-1)*h_2(n))}{\sigma^2_{c_1*h_2}}$$

the normalization here being with respect to the convolution of $c_1$ and $h_2$.

The update for the second adaptive single-frequency IIR tone detector is derived similarly:

$$B_2(n+1) = B_2(n) - \frac{1}{4} \alpha \frac{\partial(e^2)}{\partial B_2} = B_2(n) - \frac{1}{2} \alpha e(n) \frac{\partial e}{\partial B_2} \tag{25}$$

But the second block functions exactly like the single-frequency tone detector developed above: Its error output is the error output of the entire cascaded system, and its input is w(n). Therefore the update equation for the second block is:

$$B_2(n+1) = B_2(n) + \frac{\alpha e(n) c_2(n-1)}{\sigma_{c_2}^2} \quad (26)$$

$$c_2(n) = w(n) + 2\rho(n) B_2(n) c_2(n-1) - \rho^2(n) c_2(n-2)$$

Figure 11:
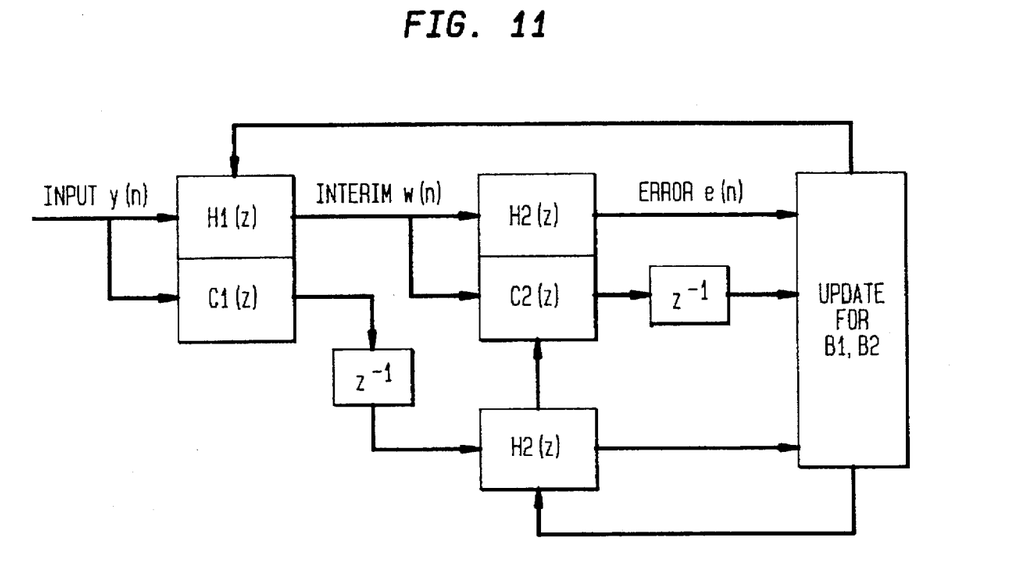
FIG. 11 provides a block diagram showing further detail of a multitone frequency detector according to the invention.

It is assumed that the radius update equations follow the rules similar to Equations 17 and 18. Equations 17, 18, 24 and 26 are therefore the update equations for the adaptive-radius adaptive IIR dual-tone detector. A block diagram of this process is shown in FIG. 11.

Figure 12:
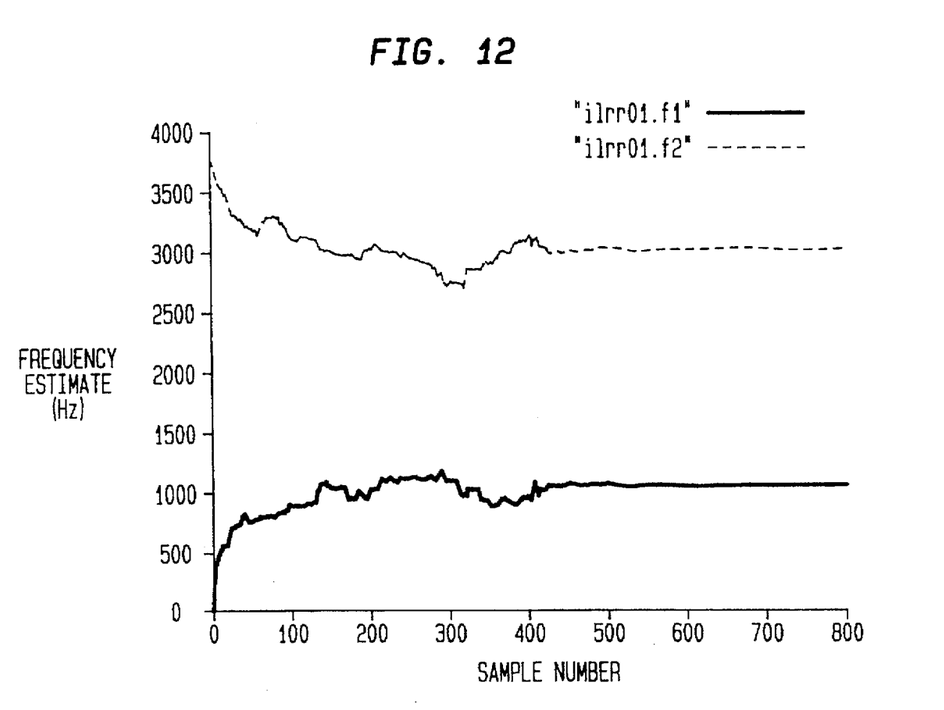
FIGS. 12 & 13 show Frequency Estimation and Signal-To-Error Ratio for a dual-tone detector developed according to the method of the invention.
Figure 13:
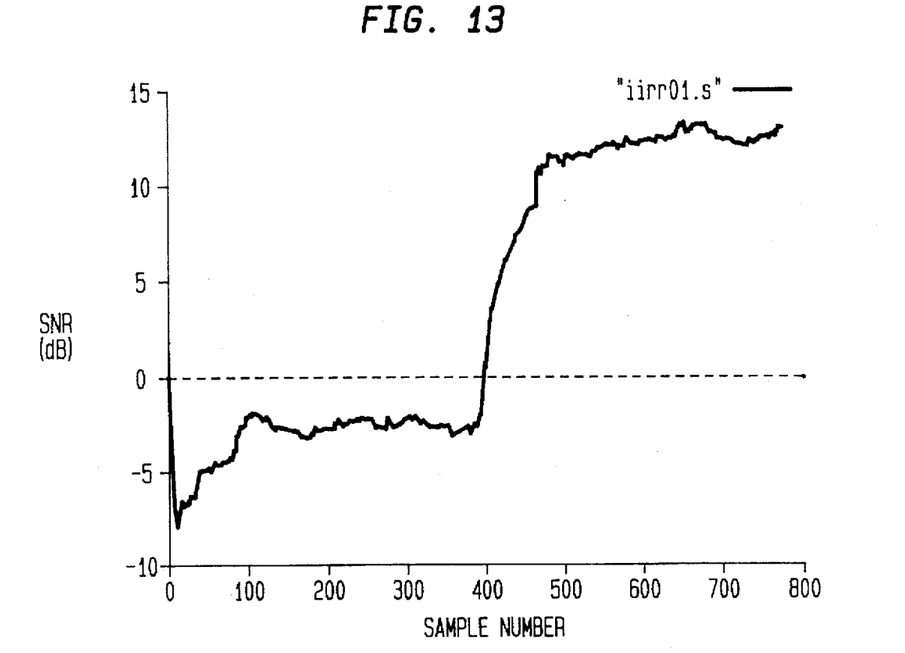

FIGS. 12 and 13 show the frequency-estimation and signal-to-noise-ratio performance of the dual-tone detector based on the following exemplary characteristics:

8 Khz sampling rate 400 samples of white gaussian noise at a power level of −27 dBm, followed by 400 samples of the sum of one tone at 1 Khz at −17 dBm, one tone at 3 Khz at −17 dBm, and white gaussian noise at a power level of −27 dBm.

The step size is set to 0.01.

The values of $B_1$ and $B_2$ were initialized to 1.0 and −1.0 so that each of the two blocks would start to seek out tones from opposite ends of the spectrum.

Figure 14:
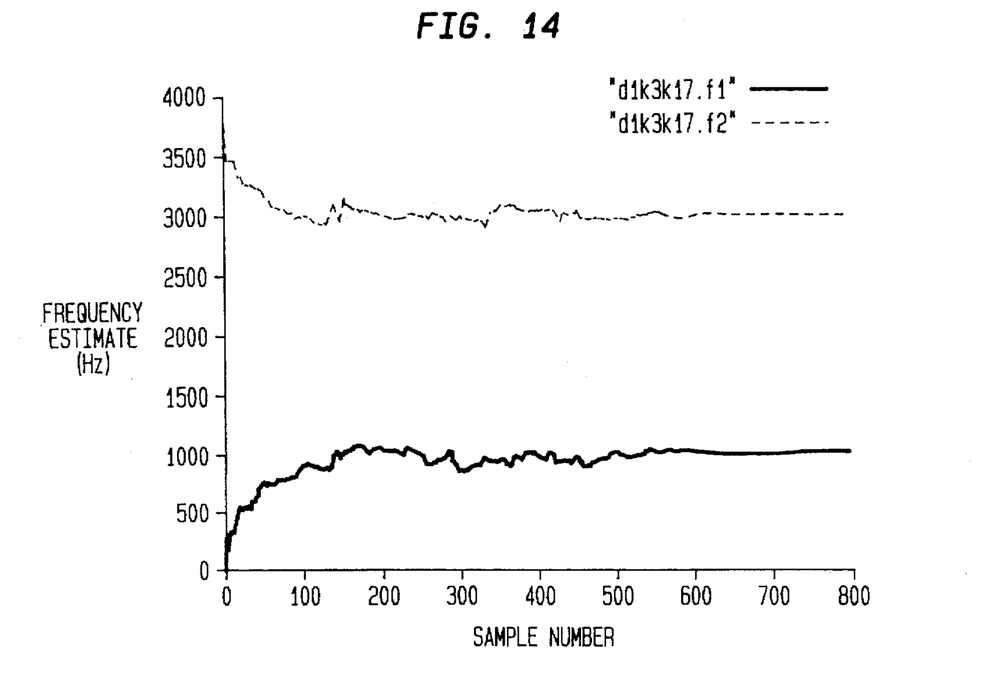
FIGS. 14 & 15 show the corresponding performance of such a dual-tone in the case of signal power and noise power being equal.
Figure 15:
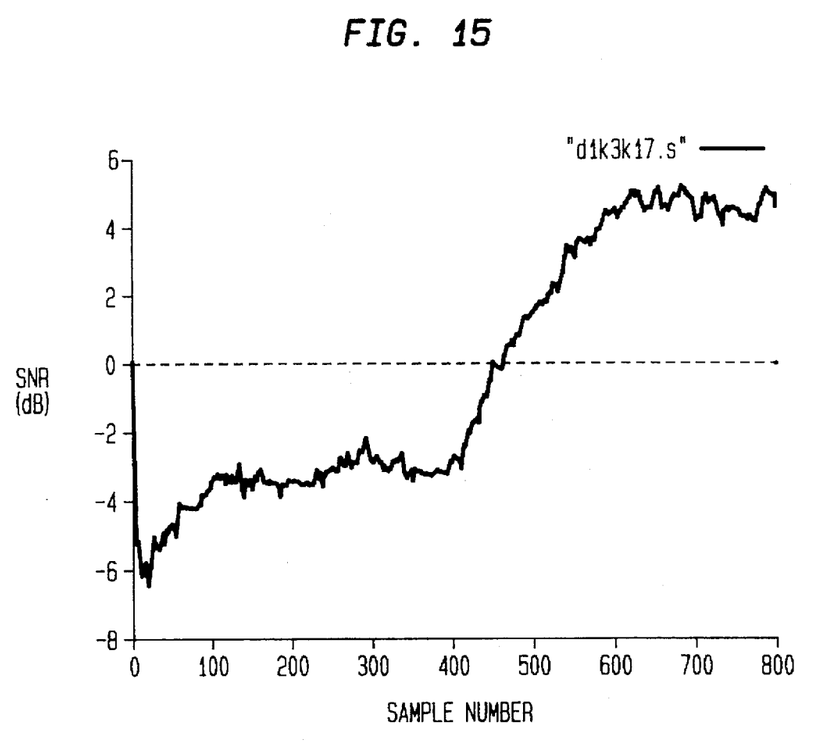

FIGS. 14 & 15 show the performance of the filter when the noise power is raised to −17 dBm. In such a case, the noise power and the power of each tone is the same.

The average of the last 200 frequency estimates is 996.635 Hz and 3001.25 Hz. The range of frequency estimates for the block that adapted to the 1 Khz tone is 985.226 Hz to 1008.00 Hz. The range of frequency estimates for the block that adapted to the 3 Khz tone is 2998.04 Hz to 3006.12 Hz.

The expansion of the cascade approach described above for building a dual-frequency tone detector to handle the detection of three or more tones with added white noise in the input stream will be apparent to those skilled in the art of the invention.

III. Conclusion

Herein has been shown an adaptive IIR tone detector which is effective to find and notch out one or more tones of interest, even in the presence of significant additive gaussian white noise. Moreover, this filter can be used to cancel out interference in an input stream when the interference consists of added tones. By monitoring the values of the frequency estimate variables (B) one can determine the frequencies of the tones in the input stream. By monitoring the state variables of the filter, one can determine both the amplitude and the phases of the tones. By monitoring the input, error output, and interim signals (i.e. the w(n) signal in the dual-frequency case), one can determine when the filter has converged, and the signal-to-noise ratios involved.

Although the present embodiment of the invention has been described in detail, it should be understood that various changes, alterations and substitutions can be made therein without departing from the spirit and scope of the invention as defined by the appended claims.

We claim:

1. A method for adaptively detecting at least one unknown frequency in an input signal, comprising the steps of:

sampling said input signal over a time interval at a predetermined sampling rate, whereby a sequence of numerical values generally proportional to values of said input signal at each sample point are provided;

operating on said sequence of numerical values with a digital filter algorithm, said algorithm having parameters chosen to cause said filter to have at least one Z-plane zero located on a Z-plane unit circle, at a radial angle, relative to a reference axis, corresponding to said at least one unknown frequency, and having at least one Z-plane pole located along a radius to said at least one Z-plane zero, displaced from an origin for said Z-plane, and lying within said unit circle; and causing said Z-plane zero to be adaptively displaced along a circumference of said unit circle corresponding to a frequency band having a maximum frequency proportional to said sampling rate, whereby a presence of said at least one unknown frequency in said frequency band is detected.

2. The method for adaptively detecting at least one frequency in an input signal of claim 1, wherein said step of causing said Z-plane zero to be displaced includes the substeps of:

determining a predicted value of said input signal for a time interval as a function of an adaptation term, said adaption term being itself related to said frequency of interest;

comparing said predicted value with an actual value of said input signal at said time interval and computing an error term related to a difference between said predicted and said actual values;

updating said adaption term based on a value of said error term; and repeating said determining, said comparing and said updating substeps until an error parameter lower than a threshold is reached.

3. The method for adaptively detecting at least one frequency in an input signal of claim 2 wherein said adaptation term is updated in a direction corresponding to a polarity of a product of said error term and a function of said input signal.

4. The method for adaptively detecting at least one frequency in an input signal of claim 1, comprising the further step of causing said displacement of said at least one Z-plane pole to be varied as said step of causing said Z-plane zero to be displaced along said circumference of said unit circle is carried out.

5. A method for detecting an unknown frequency in an input signal, where said input signal is in a form of a digitized representation of a signal pattern including a sinusoidal signal at said unknown frequency, said method comprising the steps of:

operating on said digitized input signal with a digital filter algorithm, said algorithm having parameters chosen to cause said filter to have at least one Z-plane zero located on a Z-plane unit circle, at a radial angle, relative to a reference axis, corresponding to said unknown frequency, and having at least one Z-plane pole located along a radius to said at least one Z-plane zero, displaced from an origin for said Z-plane, and lying within said unit circle; and causing said Z-plane zero to be adaptively displaced along a circumference of said unit circle corresponding to a frequency band having a maximum frequency proportional to said sampling rate, whereby a presence in said frequency band of said unknown frequency is detected.

6. The method for detecting an unknown frequency in an input signal of claim 5, wherein said step of causing said Z-plane zero to be displaced includes the substeps of:

determining a predicted value of said input signal for a time interval as a function of an adaptation term, said adaption term being itself related to said frequency of interest;

comparing said predicted value with an actual value of said input signal at said time interval and computing an error term related to a difference between said predicted and said actual values;

updating said adaption term based on a value of said error term; and repeating said determining, said comparing and said updating substeps until an error parameter lower than a threshold is reached.

7. The method for detecting an unknown frequency in an input signal of claim 6 wherein said adaptation term is updated in a direction corresponding to a polarity of a product of said error term and a function of said input signal.

8. The method for detecting an unknown frequency in an input signal of claim 5, comprising the further step of causing said displacement of said at least one Z-plane pole to be varied as said step of causing said Z-plane zero to be displaced along said circumference of said unit circle is carried out.

9. A method for adaptively detecting a plurality of unknown frequencies in an input signal, where said input signal is in a form of a digitized representation of a signal pattern including sinusoidal signals at each of said plurality of unknown frequencies, said method comprising the steps of:

operating on said digitized input signal with a digital filter algorithm, said algorithm having parameters chosen to cause said filter to have at least one Z-plane zero located on a Z-plane unit circle, at a radial angle, relative to a reference axis, corresponding to a one of said unknown frequencies, and having at least one Z-plane pole located along a radius to said at least one Z-plane zero, displaced from an origin for said Z-plane, and lying within said unit circle;

causing said at least one Z-plane zero to be adaptively displaced along a circumference of said unit circle corresponding to a frequency band having a maximum frequency proportional to said sampling rate, whereby a presence in said frequency band of a one unknown frequency among said plurality of unknown frequencies is detected; and iteratively applying said operating and said causing steps to detect each unknown frequency comprising said plurality of unknown frequencies.

10. The method for adaptively detecting a plurality of frequencies in an input signal of claim 9, wherein said step of causing said Z-plane zero to be displaced includes the substeps of:

determining a predicted value of said input signal for a time interval as a function of an adaptation term, said adaption term being itself related to said frequency of interest;

comparing said predicted value with an actual value of said input signal at said time interval and computing an error term related to a difference between said predicted and said actual values;

updating said adaption term based on a value of said error term; and repeating said determining, said comparing and said updating substeps until an error parameter lower than a threshold is reached.

11. The method for adaptively detecting a plurality of frequencies in an input signal of claim 10 wherein said adaptation term is updated in a direction corresponding to a polarity of a product of said error term and a function of said input signal.

12. The method for adaptively detecting a plurality of frequencies in an input signal of claim 10, comprising the further step of causing said displacement of said at least one Z-plane pole to be varied as said step of causing said Z-plane zero to be displaced along said circumference of said unit circle is carried out; and wherein said iteratively applying step includes said step of causing said displacement to be varied.

13. A method for adaptively detecting at least one pattern of interest by application of an Infinite Impulse Response filter to an input signal comprising the steps of:

selecting said input signal from a class of signals characterized in that:
   a Z transform of said signal will have at least one adaptation coefficient; and
   a closed form description of said signal may be realized;

causing a one of said at least one adaptation coefficients to be modified in a first direction in the case of an error term for an adaptation iteration being in phase with a function of said input signal, and to be modified in a second direction in the case of said error term and said function of said input signal being out of phase for said adaptation iteration.

14. An adaptive Infinite Impulse Response filter comprising:

means for operating on said digitized input signal with a digital filter algorithm, said algorithm having parameters chosen to cause said filter to have at least one Z-plane zero located on a Z-plane unit circle, at a radial angle, relative to a reference axis, corresponding to inn unknown frequency in said input signal, and having at least one Z-plane pole located along a radius to said at least one Z-plane zero, displaced from an origin for said Z-plane, and lying within said unit circle; and means for causing said Z-plane zero to be adaptively displaced along a circumference of said unit circle corresponding to a frequency band having a maximum frequency proportional to said sampling rate, whereby a presence in said frequency band of said unknown frequency is detected.

15. The adaptive Infinite Impulse Response filter of claim 14 wherein said means for causing further comprises:

means for determining a predicted value of said input signal for a time interval as a function of an adaptation term, said adaption term being itself related to said frequency of interest;

means for comparing said predicted value with an actual value of said input signal at said time interval and computing an error term related to a difference between said predicted and said actual values;

means for updating said adaption term based on a value of said error term; and means for repeating said determining, said comparing and said updating functions until an error parameter lower than a threshold is reached.

16. The adaptive Infinite Impulse Response filter of claim 14 further comprising:

means for causing said displacement of said at least one Z-plane pole to be varied as said step of causing said Z-plane zero to be displaced along said circumference of said unit circle is carried out.

17. The adaptive Infinite Impulse Response filter of claim 14 further comprising:

means for detecting a plurality of unknown frequencies, whereby a cascaded array of said means for operating and said means for causing are applied to said input signal, and wherein said array includes a number of cascades at least equal to the number of frequencies in said plurality of unknown frequencies.

18. The adaptive Infinite Impulse Response filter of claim 16 further comprising:

means for detecting a plurality of unknown frequencies, whereby a cascaded array of said means for operating, said first means for causing and said second means for causing are applied to said input signal, and wherein said array includes a number of cascades at least equal to the number of frequencies in said plurality of unknown frequencies.

19. An adaptive Infinite Impulse Response filter operative to detect at least one pattern of interest in an input signal, said input signal being selected from a class of signals characterized in that:

a Z transform of said signal will have at least one adaptation coefficient; and a closed form description of said signal may be realized;

wherein said filter operates to cause a one of said at least one adaptation coefficients to be modified in a first direction in the case of an error term for an adaptation iteration being in phase with a function of said input signal, and to be modified in a second direction in the case of said error term and said function of said input signal being out of phase for said adaptation iteration.

20. A method for adaptively detecting at least one frequency in an input signal, comprising the steps of:

sampling said input signal over a time interval at a predetermined sampling rate, whereby a sequence of numerical values generally proportional to values of said input signal at each sample point are provided;

operating on said sequence of numerical values with a digital filter algorithm, said algorithm having parameters chosen to cause said filter to have at least one Z-plane zero located on a Z-plane unit circle, at a radial angle, relative to a reference axis, corresponding to said at least one frequency, and having at least one Z-plane pole located along a radius to said at least one Z-plane zero, displaced from an origin for said Z-plane, and lying within said unit circle; and causing said Z-plane zero to be displaced along a circumference of said unit circle corresponding to a predetermined frequency band, whereby a presence of said at least one frequency of interest in said frequency band is detected, including the substeps of:

determining a predicted value of said input signal for a time interval as a function of an adaptation term, said adaptation term being itself related to said frequency of interest;

comparing said predicted value with an actual value of said input signal at said time interval and computing an error term related to a difference between said predicted and said actual values;

updating said adaptation term in a direction corresponding to a polarity of a product of said error term and a function of said input signal; and repeating said determining, said comparing and said updating substeps until an error parameter lower than a threshold is reached.

21. The method for adaptively detecting at least one frequency in an input signal of claim 20, comprising the further step of causing said displacement of said at least one Z-plane pole to be varied as said step of causing said Z-plane zero to be displaced along said circumference of said unit circle is carried out.

22. A method for detecting an unknown frequency in an input signal, where said input signal is in a form of a digitized representation of a signal pattern including a sinusoidal signal at said unknown frequency, said method comprising the steps of:

operating on said digitized input signal with a digital filter algorithm, said algorithm having parameters chosen to cause said filter to have at least one Z-plane zero located on a Z-plane unit circle, at a radial angle, relative to a reference axis, corresponding to a frequency of interest, and having at least one Z-plane pole located along a radius to said at least one Z-plane zero, displaced from an origin for said Z-plane, and lying within said unit circle; and causing said Z-plane zero to be displaced along a circumference of said unit circle corresponding to a predetermined frequency band, whereby a presence in said frequency band of said unknown frequency is detected, including the substeps of:

determining a predicted value of said input signal for a time interval as a function of an adaptation term, said adaptation term being itself related to said frequency of interest;

comparing said predicted value with an actual value of said input signal at said time interval and computing an error term related to a difference between said predicted and said actual values;

updating said adaptation term in a direction corresponding to a polarity of a product of said error term and a function of said input signal; and repeating said determining, said comparing and said updating substeps until an error parameter lower than a threshold is reached.

23. The method for detecting an unknown frequency in an input signal of claim 22, comprising the further step of causing said displacement of said at least one Z-plane pole to be varied as said step of causing said Z-plane zero to be displaced along said circumference of said unit circle is carried out.

24. A method for adaptively detecting a plurality of frequencies in an input signal, where said input signal is in a form of a digitized representation of a signal pattern including sinusoidal signals at each of said plurality of frequencies, said method comprising the steps of:

operating on said digitized input signal with a digital filter algorithm, said algorithm having parameters chosen to cause said filter to have at least one Z-plane zero located on a Z-plane unit circle, at a radial angle, relative to a reference axis, corresponding to a frequency of interest, and having at least one Z-plane pole located along a radius to said at least one Z-plane zero, displaced from an origin for said Z-plane, and lying within said unit circle; and causing said at least one Z-plane zero to be displaced along a circumference of said unit circle corresponding to a predetermined frequency band, whereby a presence in said frequency band of a frequency among said plurality of frequencies is detected, including the substeps of:

determining a predicted value of said input signal for a time interval as a function of an adaptation term, said adaptation term being itself related to said frequency of interest;

comparing said predicted value with an actual value of said input signal at said time interval and computing an error term related to a difference between said predicted and said actual values;

updating said adaptation term in a direction corresponding to a polarity of a product of said error term and a function of said input signal; and repeating said determining, said comparing and said updating substeps until an error parameter lower than a threshold is reached;

iteratively applying said operating and said causing steps to detect each frequency comprising said plurality of frequencies.

25. The method for adaptively detecting a plurality of frequencies in an input signal of claim 24, comprising the further step of causing said displacement of said at least one Z-plane pole to be varied as said step of causing said Z-plane zero to be displaced along said circumference of said unit circle is carried out; and wherein said iteratively applying step includes said step of causing said displacement to be varied.

26. An adaptive Infinite Impulse Response filter comprising:

means for operating on a digitized input signal with a digital filter algorithm, said algorithm having parameters chosen to cause said filter to have at least one Z-plane zero located on a Z-plane unit circle, at a radial angle, relative to a reference axis, corresponding to a frequency of interest, and having at least one Z-plane pole located along a radius to said at least one Z-plane zero, displaced from an origin for said Z-plane, and lying within said unit circle; and means for causing said Z-plane zero to be displaced along a circumference of said unit circle corresponding to a predetermined frequency band, whereby a presence in said frequency band of an unknown frequency is detected, said means for causing said Z-plane zero displacement further comprising:

means for determining a predicted value of said input signal for a time interval as a function of an adaptation term, said adaptation term being itself related to said frequency of interest;

means for comparing said predicted value with an actual value of said input signal at said time interval and computing an error term related to a difference between said predicted and said actual values;

means for updating said adaptation term based on a value of said error term; and means for repeating said determining, said comparing and said updating functions until an error parameter lower than a threshold is reached; and means for causing said displacement of said at least one Z-plane pole to be varied as said step of causing said Z-plane zero to be displaced along said circumference of said unit circle is carried out.

27. The adaptive Infinite Impulse Response filter of claim 26 further comprising:

means for detecting a plurality of unknown frequencies, whereby a cascaded array of said means for operating and said means for causing are applied to said input signal, and wherein said array includes a number of cascades at least equal to the number of frequencies in said plurality of unknown frequencies.

28. The adaptive Infinite Impulse Response filter of claim 26 further comprising:

means for detecting a plurality of unknown frequencies, whereby a cascaded array of said means for operating, said first means for causing and said second means for causing are applied to said input signal, and wherein said array includes a number of cascades at least equal to the number of frequencies in said plurality of unknown frequencies.

* * * * *